(12) United States Patent
Manry et al.

(10) Patent No.: US 9,135,601 B2
(45) Date of Patent: Sep. 15, 2015

(54) VERIFICATION-BASED ACCESS TO FEATURES IN A BUSINESS CONTEXT-BASED SOCIAL NETWORK

(75) Inventors: John W. Manry, Clearwater, FL (US); Bryson W. Hale, St. Petersburg, FL (US)

(73) Assignee: SAGE Software, Inc., Irvine, CA (US)

( * ) Notice: Subject to any disclaimer, the term of this patent is extended or adjusted under 35 U.S.C. 154(b) by 174 days.

(21) Appl. No.: 13/544,076

(22) Filed: Jul. 9, 2012

(65) Prior Publication Data

US 2014/0012908 A1 Jan. 9, 2014

(51) Int. Cl.
  *G06F 15/16* (2006.01)
  *G06F 21/45* (2013.01)
  *G06Q 10/10* (2012.01)
  *G06Q 50/00* (2012.01)

(52) U.S. Cl.
  CPC ............... *G06Q 10/10* (2013.01); *G06Q 50/01* (2013.01)

(58) Field of Classification Search
  CPC .................................................... H40L 61/151
  USPC ......................................................... 709/204
  See application file for complete search history.

(56) References Cited

U.S. PATENT DOCUMENTS

| | | | | |
|---|---|---|---|---|
| 8,683,557 | B1 * | 3/2014 | Desikan et al. | 726/4 |
| 2010/0005518 | A1 * | 1/2010 | Tirpak et al. | 726/6 |
| 2011/0055911 | A1 * | 3/2011 | Adelman et al. | 726/7 |
| 2011/0119230 | A1 * | 5/2011 | Zuber | 707/608 |
| 2012/0324543 | A1 * | 12/2012 | Tam et al. | 726/4 |
| 2013/0013553 | A1 * | 1/2013 | Stibel et al. | 707/602 |
| 2013/0031176 | A1 * | 1/2013 | Shih et al. | 709/204 |
| 2013/0091540 | A1 * | 4/2013 | Chen et al. | 726/1 |
| 2013/0160089 | A1 * | 6/2013 | Stibel | 726/4 |
| 2013/0191464 | A1 * | 7/2013 | Burckart et al. | 709/206 |
| 2013/0239185 | A1 * | 9/2013 | Orttung et al. | 726/5 |
| 2013/0298216 | A1 * | 11/2013 | Kuznetsov | 726/8 |
| 2013/0340097 | A1 * | 12/2013 | Gowel | 726/28 |
| 2015/0058320 | A1 * | 2/2015 | Zheng et al. | 707/722 |

OTHER PUBLICATIONS

"The Facebook Blog—Facebook Tips: What's the Difference Between a Facebook Page and Group?", http://www.facebook.com/blog/blog.php?post=324706977130 (3 pages) (printed Jul. 9, 2012).

* cited by examiner

*Primary Examiner* — Kevin Bates
*Assistant Examiner* — Mark A Scott
(74) *Attorney, Agent, or Firm* — Matthew M. Hulihan, Esq.; Heslin Rothenberg Farley & Mesiti P.C.

(57) ABSTRACT

Access to features in a business context-based social network is provided based on verification of a provided association between a user's social network account and a verified social network account of an organizational entity. The association represents a relationship between the user and the organizational entity outside of the business context-based social network. Based on verification of the account of the organizational entity and on the provided association, access is enabled for the account of the user to one or more features offered by a social network account of another organizational entity in the business context-based social network. The access provided for the account of the user to the one or more features is authorized based on the provided association between the verified account of the organizational entity and the account of the user.

20 Claims, 7 Drawing Sheets

VERIFICATION-BASED ACCESS TO FEATURES IN A BUSINESS CONTEXT-BASED SOCIAL NETWORK

BACKGROUND

A social network service provides an online platform focused on building and reflecting social networks and relations among friends, family, and those who share interests. It enables users of the service to make their own communities in which to share ideas, activities, events, and interests, both within their individual networks and with the community at large. The social network service includes users who, via a representation of themselves (an "account"), interact with other users and a variety of additional services. Various forms of online community services can be considered social network services that tend to focus on more group-centered networking than individual-centered networking.

Social network services and online communities present relationships between users. The users can access services based on their presence in the social network. Users of the service are largely free-standing, opting into and controlling their memberships and affiliations with groups within the social network. This, however, does not provide any assurance to other users of the group or group organizer that an individual user is who he/she says he is. Similarly, there is no guarantee that an organization or a group in the social network is the actual entity that it claims to represent. Social network capabilities are needed to address these problems in order to provide trustworthiness within a social network.

BRIEF SUMMARY

The shortcomings of the prior art are overcome and additional advantages are provided through the provision of a method for providing access to features in a business context-based social network. The method includes, for instance: verifying a social network account of an organizational entity in the business context-based social network, the verified social network account of the organizational entity having associated therewith one or more authorized administrators of the verified social network account of the organizational entity; providing an association between the verified social network account of the organizational entity and a social network account of a user of the business context-based social network, the association representative of a relationship between the user and the organizational entity outside of the business context-based social network; and based on the verifying the social network account of the organizational entity and on the providing the association, enabling, by a processor, for the social network account of the user, access to one or more features offered by a social network account of another organizational entity in the business context-based social network, wherein the access provided for the social network account of the user to the one or more features offered by the social network account of the another organizational entity is authorized based on the provided association between the verified social network account of the organizational entity and the social network account of the user.

Further provided is a computer system for providing access to features in a business context-based social network. The computer system includes a memory and a processor, in communications with the memory. The processor is configured to execute program code stored in the memory to perform, for instance: verifying a social network account of an organizational entity in the business context-based social network, the verified social network account of the organizational entity having associated therewith one or more authorized administrators of the verified social network account of the organizational entity; providing an association between the verified social network account of the organizational entity and a social network account of a user of the business context-based social network, the association representative of a relationship between the user and the organizational entity outside of the business context-based social network; and based on the verifying the social network account of the organizational entity and on the providing the association, enabling, for the social network account of the user, access to one or more features offered by a social network account of another organizational entity in the business context-based social network, wherein the access provided for the social network account of the user to the one or more features offered by the social network account of the another organizational entity is authorized based on the provided association between the verified social network account of the organizational entity and the social network account of the user.

In addition, a computer program product is provided for providing access to features in a business context-based social network. The computer program product includes a computer readable storage medium readable by a processor and storing instructions for execution by the processor to perform a method that includes, for instance: verifying a social network account of an organizational entity in the business context-based social network, the verified social network account of the organizational entity having associated therewith one or more authorized administrators of the verified social network account of the organizational entity; providing an association between the verified social network account of the organizational entity and a social network account of a user of the business context-based social network, the association representative of a relationship between the user and the organizational entity outside of the business context-based social network; and based on the verifying the social network account of the organizational entity and on the providing the association, enabling, for the social network account of the user, access to one or more features offered by a social network account of another organizational entity in the business context-based social network, wherein the access provided for the social network account of the user to the one or more features offered by the social network account of the another organizational entity is authorized based on the provided association between the verified social network account of the organizational entity and the social network account of the user.

Additional features and advantages are realized through the concepts of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
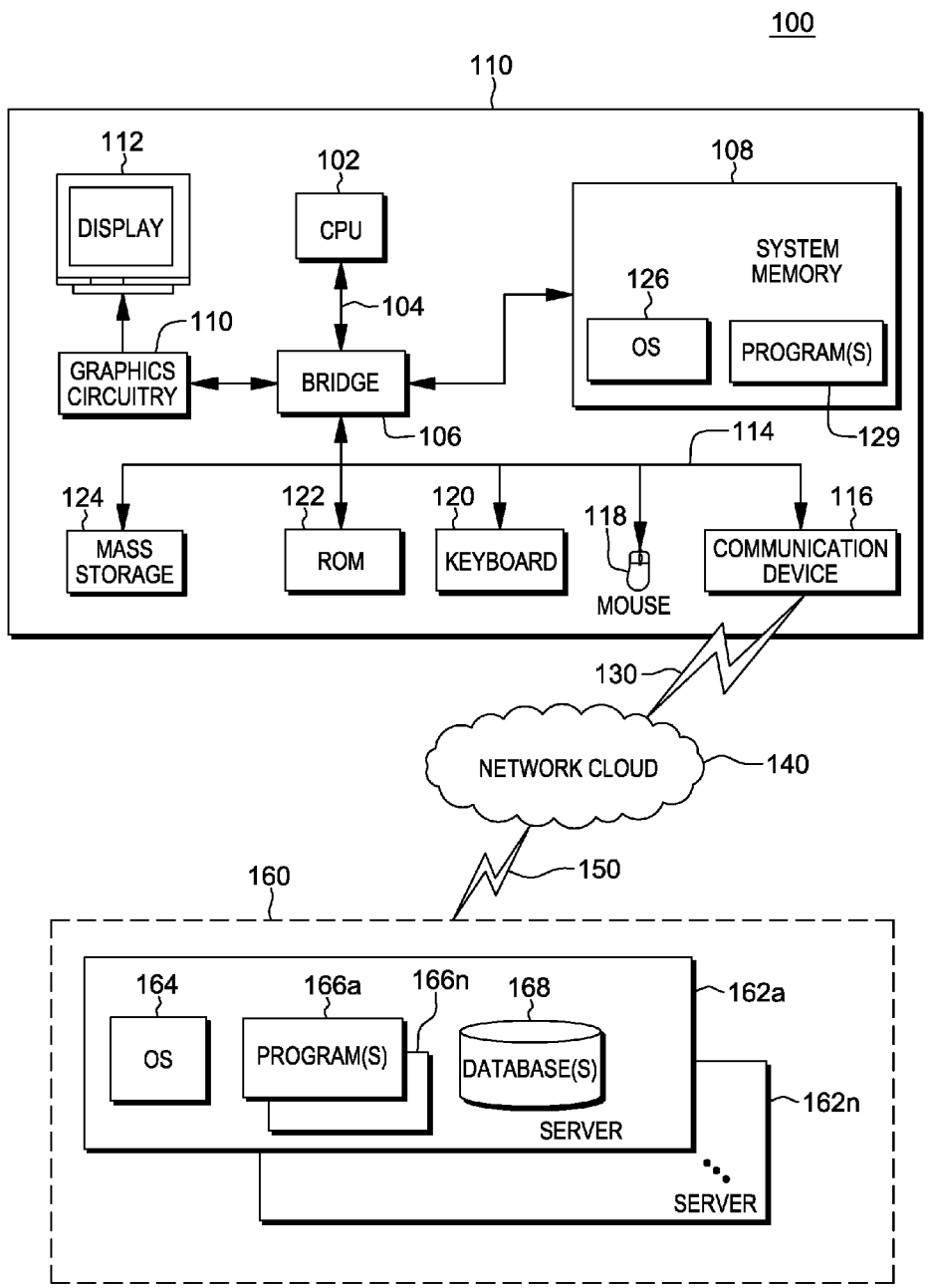
FIG. 1 depicts a block diagram of one example of a computing environment to incorporate and use one or more aspects of the present invention.

Described herein is a business context-based social network service (also referred to herein as a "business context-based social network" or simply a "social network") that allows business and individual collaboration, communication, and access to features with assurance that the parties involved are certified as legitimate participants with known and confirmed organizational associations and roles. In the business context-based social network, association(s) between an account of an organizational entity (also referred to herein as "organization") and the accounts of the organization's employees and associates can be driven based on inherent real-life relationships between the organization and those employees/associates, and in particular based on the roles that the organization employees/associates have with respect to that organization or other, affiliated, organizations. These inherent relationships therefore provide a business driven context in which relationships between accounts within the network are established.

Existing social networking services do not have the ability to verify an organization or the roles of users associated with that organization in the social network. Additionally, there is no convenient way for fine-grain management of feature access on a per-user level for each combination of organization and feature offered in the social network, or of securing and verifying employment or membership relationships indicated in the social network between users thereof and the organization.

As an example, there is no way in an online community to confirm whether an account in the social network actually represents a real organization outside of the social network actually, or, if a real organization exists, that the account has been certified as being administered by that real organization. Existing social networks also do not provide secure mechanisms for users to be invited and managed in the context of their roles and employment or associations with a group/organization.

Existing systems additionally do not provide a robust environment in which relationship verification gives assurance to others that features provided to users is appropriate and authorized. Employee Self Service systems, for instance, are usually provided as an extension of a given human resources (HR) or payroll function and provide information for a variety of services to an employee of the organization, but there is no association between that organization and other organizations such that the relationship (e.g. employment) status drives communication and collaboration between the employee and the other organizations. Also, user credential management tools, such as Active Directory, are typically restricted to employees and authorized users of an organization's internal system(s), and thus do not have knowledge or assurance of the rest of the user population across multiple others organizations. Single sign-on systems, which map one or more user log-in credentials to multiple systems in order to avoid requiring the user to use many different log-ins, do not provide cross-organizational management of the verified organizations or enable inherent user rights as a by-product of a verified relationship between an organization and a member/employee of that organization.

Furthermore, virtually anyone can set up a company or organization account in an existing social network, but this it typically not verified as being (i) a legitimate, real business or (ii) the actual business which it purports to represent. As a result, other organizations and users who link to such an organization cannot be certain that the organization represented by the account is a valid business and is managed by authorized members within that business. As an example, someone can register in an existing social network service an account for a group with the same name as a valid business and portray the group as being the official representation of that company within the network. End users, however, have no easy way to confirm whether the account is official and trustworthy.

Similarly, a user setup with an account in the social network may have no organizational or job association to an organization/employer, or, if there is an association, the association is not verified. Consequently, there is no reliable way to confirm that that the person is actually a member of the organization he/she indicates, or that he/she serves the indicated role within that organization. For instance, a user might setup an account and indicate that he/she is the CEO of Company A. There is no confirmation within the system that the user is actually the CEO of Company A.

Aspects of the present invention provide a practical and easily maintained business context that can be applied to social networking concepts in order to facilitate new ways for businesses and users to interact within a social network. A typical social networking service relies on a user's profile and the user's own decisions to associate himself/herself with other accounts in the social network, or to opt in or out of a group to manage the experience. This self-managed approach is not very usable or sufficiently trustworthy for use in delivering business-based services, where a high-level of assurance of the legitimacy of the parties and relationships is desired. The business context-based social network described herein enables verification of the organizational entities and enables the organizational entities themselves to certify the validity of the relationships with other organizational entities and users within the social network.

FIG. 1 depicts a block diagram of one example of a computing environment to incorporate and use one or more aspects of the present invention. A set of components referred to herein as a computing environment 100 comprises one or more client workstations 110 which is/are a user (e.g. of the social network) computer system. Workstation 110 includes a processor (in this example a central processing unit (CPU)) 102 for performing computations. CPU 102 is coupled to a bus bridge 106 by way of a CPU bus 104. Bus bridge 106 includes a memory controller (not shown) integrated therein, though the memory controller may be external to bus bridge 106. The memory controller provides an interface for access by CPU 102 or other devices to system memory 108. System memory 108 can include any of a variety of types of memory device or memory circuitry for storing data. Bus bridge 106 is coupled to graphics circuitry 110 for controlling display device 112. Graphics circuitry 110 includes, in one example, a video controller, video memory for storing display data to be displayed on display device 112, and a video BIOS that includes code and video services for controlling the video controller, as is well known in the art. In another embodiment, graphics circuitry 110 is coupled to CPU 102 through an Advanced Graphics Port (AGP) bus.

Display device 112 includes a display screen that may be a CRT or LCD monitor, a television which is connected to a set top box, a laptop display, or the like. Navigation through a graphical user interface provided by an operating system may be provided through the use of control buttons on a remote control unit, or by other means known in the art.

Bus bridge 106 is also coupled to a system bus 114 that may be a peripheral component interconnect (PCI) bus, Industry Standard Architecture (ISA) bus, etc., and combinations thereof, as examples. Coupled to system bus 114 are communication device 116, mouse 118, keyboard 120, non-volatile memory 122, and mass storage 124. One or more other input/output (I/O) devices (not shown) may also be coupled to system bus 114.

Mass storage device 124 can be any of numerous different types of such devices including a hard disk, floppy disk, CD-ROM, DVD-ROM, tape, high density floppy, high capacity removable media, low capacity removable media, solid state memory device, etc., and combinations thereof. Non-volatile memory 122 may be a read-only memory (ROM), flash memory, etc., and can include a system BIOS for controlling, among other things, hardware devices in workstation 110.

Communication device 116 includes a network card, a modem interface, etc. for accessing a network cloud 140 via a communications link 130. Communications link 130 links workstation 110 to a network cloud 140, and further to a communications link 150 linking the architecture of a business context-based social network 160 to network cloud 140. In one embodiment, network cloud 140 includes the Internet. Alternatively or additionally, network cloud 140 may include a local area network (LAN), wide area network (WAN), Intranet, etc., and/or combinations thereof.

As is familiar to those having ordinary skill in the art, workstation 110 further includes an operating system 126, which is loaded into system memory 108 from mass storage device 124, for instance, and launched after a power-on self-test (POST). Operating system 126 includes a set of one or more programs that control computer system 110's operation and the allocation of resources thereof, among other things. Example operating systems include, but are not limited or restricted to, DOS, Unix, Linux, the Windows® line of operating systems offered by Microsoft Corporation, Redmond, Wash., and the "OS" line of operating systems (such as OS X®) offered by Apple Inc., Cupertino, Calif., etc. Also loaded into memory 108 of the computer system 110 are additional program(s) 129, for instance program(s) to access social network 160. In one example, a program 129 to access social network 160 includes a web-browser. In another example, program 129 to access social network 160 includes a specialized application package, such as a suite of software. In one embodiment, program 129 to access social network 160 includes the Construction Anywhere product offered by The Sage Group plc (North Park, Newcastle Upon Tyne, United Kingdom) through its subsidiary Sage North America (Irvine, Calif., USA).

Social network 160 includes one or more servers 162a-162n that are coupled to each other via a LAN, through intervening networks, or other arrangement. Servers 162a-162n each include a processor, memory, communication circuitry, and software running thereon. Specifically, update server 162a includes an operating system 164, one or more programs 166a-166n, and one or more database(s) 168, such as user data stores described in further detail below.

The one or more application programs 166 (166a is depicted in FIG. 1) are, in one example, responsible for execution to communicate with workstation 110, and more specifically, to enable users and organizational entities access to the social network and features thereof. For instance, account signup, sign on, administration, as well as control of access to, and interaction with, the features provided within the social network may all be facilitated via program(s) 166.

Social network 160 and/or one or more servers 162 thereof are operated, in one example, by a developer of program 129 executing on workstation 110 to access social network 160. The developer may install/maintain/update program 129 from time to time.

Although program 129 to access social network 160 is depicted on workstation 110, those having ordinary skill in the art will recognize that a portion or facilities of program 129 could reside partially on a remote system, such as on a server of social network 160, in one example, and provide program facilities across a web-based interface, such as communications links 130 and 150. Similarly, aspects of server(s) 162, such as program(s) 166 thereof, need not reside on a remote system such as a server 162, but could instead be implemented at least partially on workstation 110. Computer environment 100 is therefore just one example of a computing environment to incorporate and use one or more aspects of the present invention.

Figure 2:
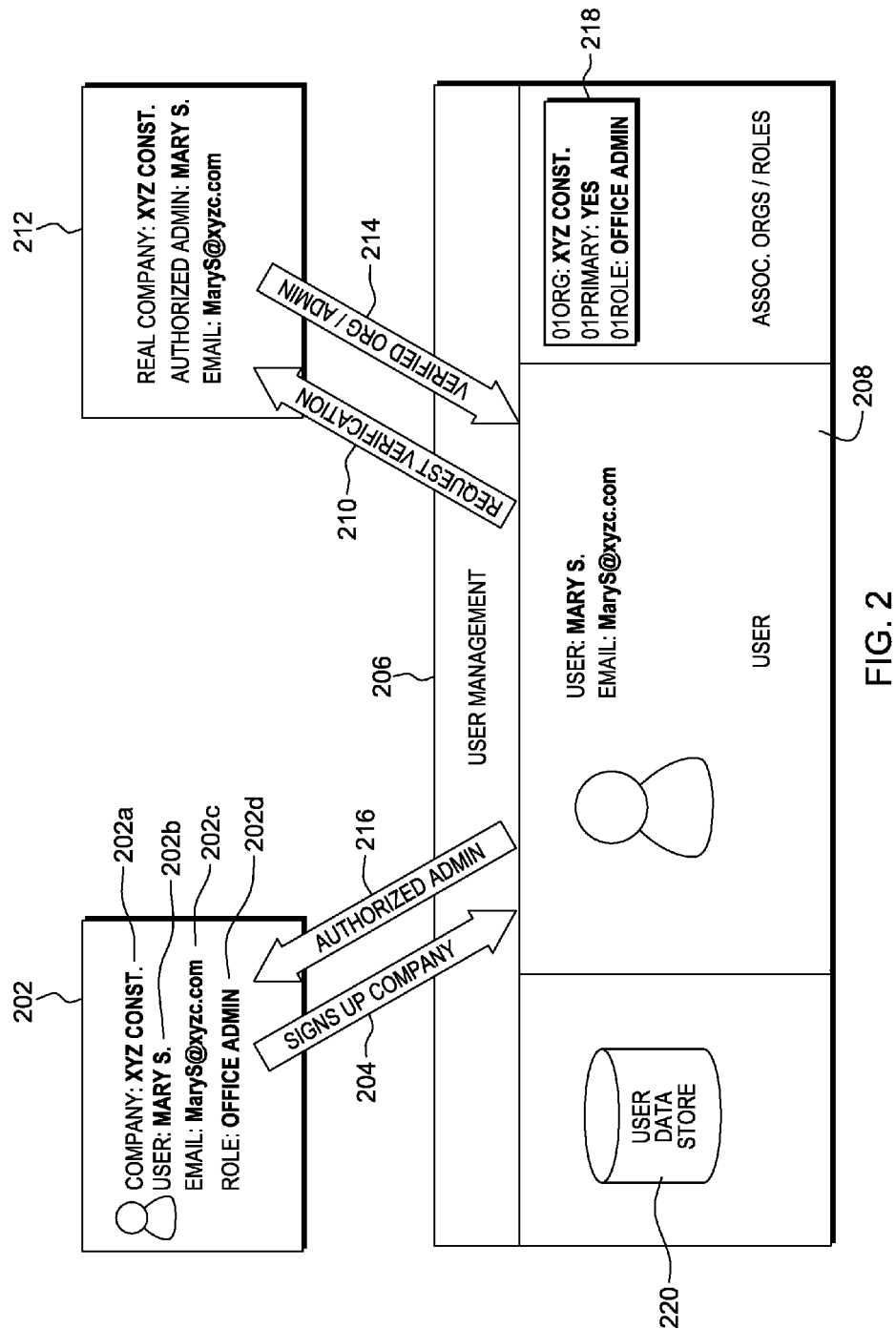
FIG. 2 depicts one example of verification of a social network account of an organizational entity within a business context-based social network, in accordance with one or more aspects of the present invention.

An organizational entity can signup or otherwise become a member/user of the social network and have an account which permits access to the social network. Such organizations can include any type of organization, including but not limited to a business entity, trade union, or group having a member base. According to an aspect of the present invention, the organization's account can become verified to provide, for instance to other users/organizations in the social network, a level of trustworthiness that the social network account of the organizational entity is legitimate and authorized by the actual organization purportedly represented by the account. FIG. 2 depicts one example of verification of a social network account of an organizational entity within a business context-based social network, in accordance with one or more aspects of the present invention.

In FIG. 2, organizational entity 202, known as XYZ Construction 202a, signs up for an account by way of a user (Mary S.) 202b. User 202b has an associated work email address 202c and role (Office Admin) 202d within the organization. Role 202 indicates a relationship, outside of the social network, between user 202b and organization 202. Specifically, Mary is an Office Admin of XYZ Construction. In signing up (204) XYZ Construction for an account, a user management component 206 of the social network creates a user record 208 for Mary. In this example, since Mary is signing up the organization, a request for verification (210) is made, automatically in one embodiment, as a result of the signup, to verify the organizational entity being setup. Additionally, the verification in this case also verified Mary as an authorized administrator of the account for XYZ Construction.

The request for verification (210) is made to a verification entity 212. In one example, verification entity 212 is an administrator of the social network. In another example, verification entity 212 is a system that can automatically verify the organization and authorize the administrator/user based on an already-maintained status of the user and/or organization. A provider of the social network, for instance, may have an existing customer base of known, legitimate, real-world organizations. In one example, these existing relationships, which have been verified based on real-world business dealings, can be leveraged to verify that the organizational entity and/or the user setting up the account of that organizational entity is known to be a valid.

Verification entity 212 may be maintained, in one example, by a provider of the social network and/or by the actual organizational entity being verified, and, in one example, the verification is provided via an existing system that is known to be accurate and trusted. In other situations, verification entity 212 includes one or more agents/administrators who are entrusted with authority to perform such verification.

In this manner, a verification entity will verify, for instance, not only an organizational entity, but also a user's claim about an association that the user has to the organizational entity, for instance that the user is an authorized administrator of the account for the organizational entity. Similarly, if a user indicates a specific title within an organization, such as district manager, that too can be vetted to indicate whether or not that association is valid.

Turning back to FIG. 2, verification entity 212 will verify that XYZ Construction is a real company, and that Mary is an authorized administrator of the account for XYZ Construction. As a result of the verification, verification entity 212 provides verification (214) back to user management component 206 to indicate that the organizational entity, XYZ Construction, is verified, and that user Mary S. is authorized to administer (216) by way of her account the account of XYZ construction. Later, additional authorized administrators can be added by existing authorized administrators.

Additionally, an association 218 is made in the user management component 206. The association associates the account of user Mary S. with the account for XYZ Construction and indicates Mary's role as the Office Admin. Association 218 is representative of the relationship between Mary and XYZ Construction outside of the social network (i.e. that Mary is employed by XYZ Construction and is an Office Admin).

In this example, a new account for Mary is being setup and has no prior associations. Organizational entity XYZ Construction is indicated as a primary (or "home") organization for Mary. Primary (or home) refers to the fact that Mary's association with the organization is maintained by an authorized administrator of the account of that organization to which the association is made. For instance, the association between Mary's account and XYZ's account may be maintained by a super administrator of XYZ's account. This is in contrast to a situation in which an association between a user's account and the organization's account is maintained based on the status of another association of that user in the social network. For instance, as is described in further detail below, an association between a user and another organization can be based on the user's association to a primary organization. That primary association therefore may give rise to a secondary association with a secondary organization, and the secondary association can itself give rise to a tertiary association, and so forth.

User management component 206 also includes user data store 220. User data store 220 can store any past and present data about Mary's account, for instance any information pulled/pushed into the social network from existing information sources (such as human resources or payroll systems), financial institutions (such as retirement account providers), employment-related clearances/certifications (background/drug checks, security clearances etc.), as well as any information that the user has setup or provided, such as in his/her user profile. Data in user data store 220 will typically be retained and associated with the user's account indefinitely. As an example, if Mary were to become disassociated with XYZ Company and begin employment with another company, her past employment status with XYZ company, as well as any information pulled into the social network and related to her employment with XYZ Company (financial, HR & payroll, etc.), will be retained, in one embodiment. Additionally or alternatively, information such as the above can be stored in a feature (or service) in the social network, for instance a feature or service for Mary's account is given access. Storage of such information enables continued selective access to features/services by the user (e.g. user's account) even when the relationship between the user and the organization has been changed, such when the user is no longer employed by the organization. Advantageously, when a user is no longer connected (by way of an association) to an organization in the social network, this does not necessarily remove the user's access to information from that service. Because the user's account remains the same, the service can continue to grant the user access where appropriate. As an example, once an organization publishes an employee's paychecks through a service in the social network, access to this information has been granted to the employee's account forever, whether the employee remains employed with that organization or not. Access to other information, features, or services provided by that organization's account, however, could change. One example is access to an employee's W-2 or 401k retirement fund account. Continued access will often be permitted in these cases. However, for many features/services, such as those that are to be accessible only to employees or others who maintain a continued, privileged relationship with the organization, access to these features will be disabled upon a change in the association between the user and the organization, such that the user's account is not permitted to access such features (see example below with respect to FIG. 5).

Authorized administrators of an account of an organizational entity have the ability to invite other users to become associated with the organizational entity within the social network. In one embodiment, an association is created and automatically verified based on the fact that an authorized administrator of a verified account for the organization has invited the user. In other embodiments, for instance when an association is created by the user rather than an authorized administrator of the organization's account, the association is initially unverified and can become verified by the authorized administrator.

Figure 3:
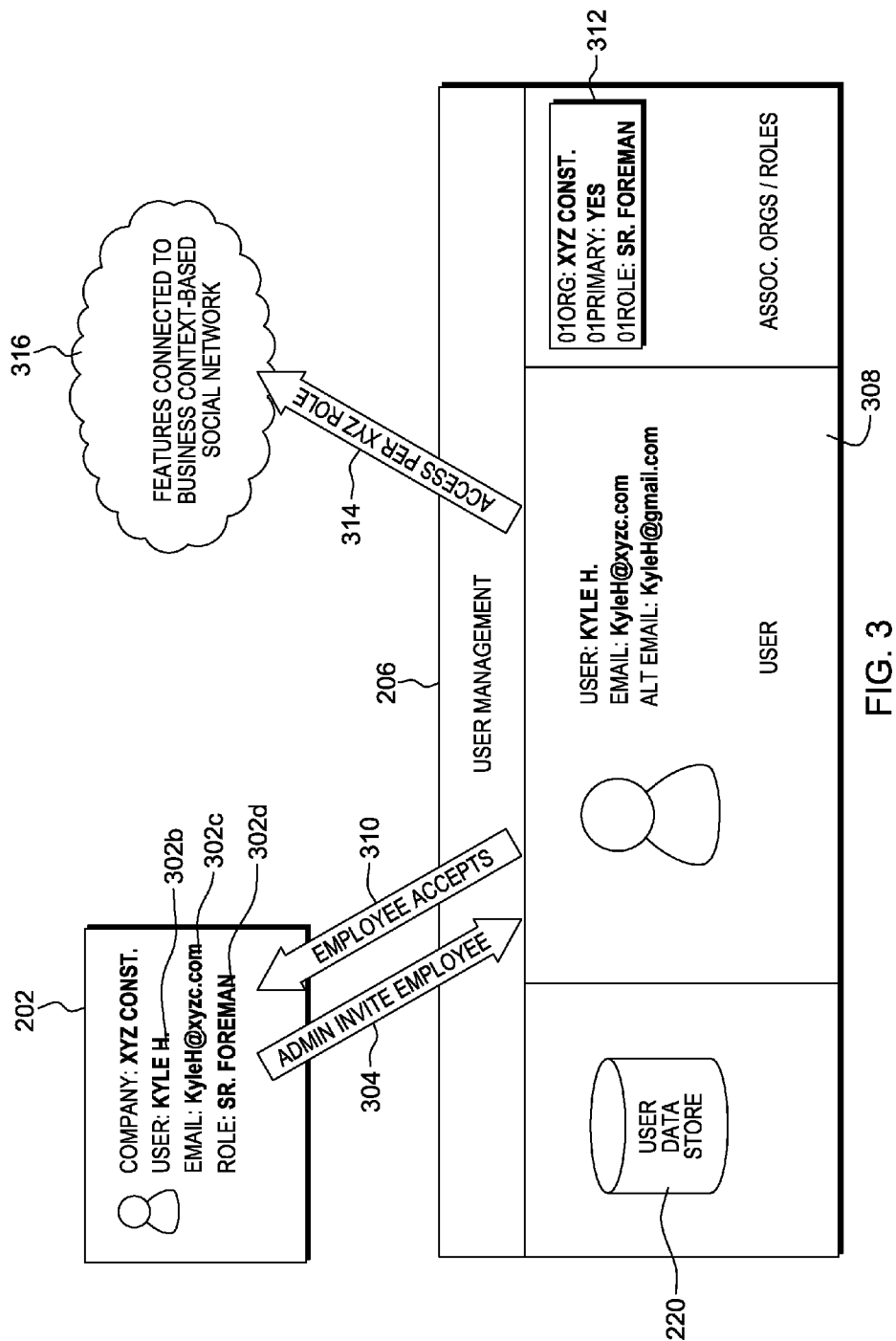
FIG. 3 depicts one example of enabling access to features in the social network based on a verified association between a social network account of an organizational entity and a social network account of a user, in accordance with one or more aspects of the present invention.

After verification of the association, access to feature(s) offered by the account of the organizational entity (or accounts of other organizational entities, as described with reference to FIG. 4) can be enabled based on this verified association. FIG. 3 depicts one example of enabling access to features in the social network based on a verified association between a social network account of an organizational entity and a social network account of a user, in accordance with one or more aspects of the present invention. In FIG. 3, organizational entity 202 (again XYZ Construction) employs Kyle H. 302b, having work email address KyleH@xyzc.com 302c, and being a Senior Foreman 302d at XYZ Construction.

An authorized administrator of the social network account for XYZ Corporation can invite (304) Kyle to become associated with the organization in the social network, i.e. for an association to be made between Kyle's account (308) and the account of XYZ Construction. If Kyle is not already setup with an account in the social network, the invitation serves a dual role of inviting Kyle to join (signup for an account with) the social network, as well as to associate the (newly created) account for Kyle with the account for XYZ Corporation, and verify the association. As a result of the signup, user record 308, as above in FIG. 2, indicates Kyle's work email address (KyleH@xyzc.com) and, in this example, Kyle's personal email address (KyleH@gmail.com). Kyle's user profile information, including any associations between his account and other accounts in the social network, can be saved in user data store 220.

If Kyle already has an account with the social network, the invitation will invite Kyle to become associated with XYZ Corporation within the social network. In other embodiments, where Kyle or the organization has created an association between Kyle's account and the organization's account, but that association is not yet verified, the invitation from/by the authorized administrator could serve as the verification to confirm the relationship represented by the association and indicated therein between Kyle and XYZ Corporation outside of the business context-based social network. Verification of the association confirms that the relationship represented by the association between the user and the organizational entity outside of the business context-based social network is accurate. In yet another example, no invitation is provided by the authorized administrator, but instead Kyle creates the association and the association is verified, either automatically or by an authorized administrator of the account for XYZ Corporation, as examples. In one example of automatic verification, an association between a user's account and an organizational entity's account is based on an existing system, such as an HR or payroll system actively maintaining employee statuses with XYZ Corporation. Thus, verification of an association can be automatic based on the user's existence in one or more systems maintained by the organization or associated entity, which one or more systems are accessible to the social network.

Returning to FIG. 3 where an invitation is provided, and then accepted by Kyle through his account (310), an association 312, if not already created, is created for Kyle user record 308. Association 312 indicates an association with organization XYZ Construction, indicates that this is a primary association for Kyle, and indicates Kyle's role within the organization (i.e. as Sr. Foreman). Additionally, association 312 in this example is verified since it is based on an invitation from an authorized administrator of the account of the organization. An authorized administrator who invites a user to the social network and to become association with the organization is implicitly, in one example, verifying the association should the user accept the invitation. Association 312 is a primary association because association 312 is being maintained by an authorized administrator of XYZ's account. This is in contrast to a secondary (or tertiary, etc.) association between Kyle's account and another organization's account, where maintenance of that association is by an authorized administrator of XYZ's account and not an administrator of the another organization's account (see FIG. 4).

Thereafter, based on association 312 being verified, access (314) to one or more features 316 offered in the social network, for instance by the account of XYZ Construction, is enabled for Kyle's account. Features 316 can include any services, privileges, tools, components, or other modules to which access can be granted and controlled, in whole or part, by the social network and/or the accounts in the social network. The features within the social network need not be provided by the social network architecture itself, but can instead include features provided remotely by other entities, but to which access can be offered by accounts within the social network and controlled via facilitates of the social network.

Furthermore, the features may, but need not necessarily, be features provided by the account the organization which verified the association between the user account and the organization account. In some embodiments, the features may be provided by an account of another organizational entity, where the access being given depends to some extent on the verification of the association. FIG. 4 depicts one example of enabling access to features provided by a first organizational entity within the social network, where the access is based on a verified association between the social network account of a user and a social network account of a second organizational entity within the social network.

Figure 4:
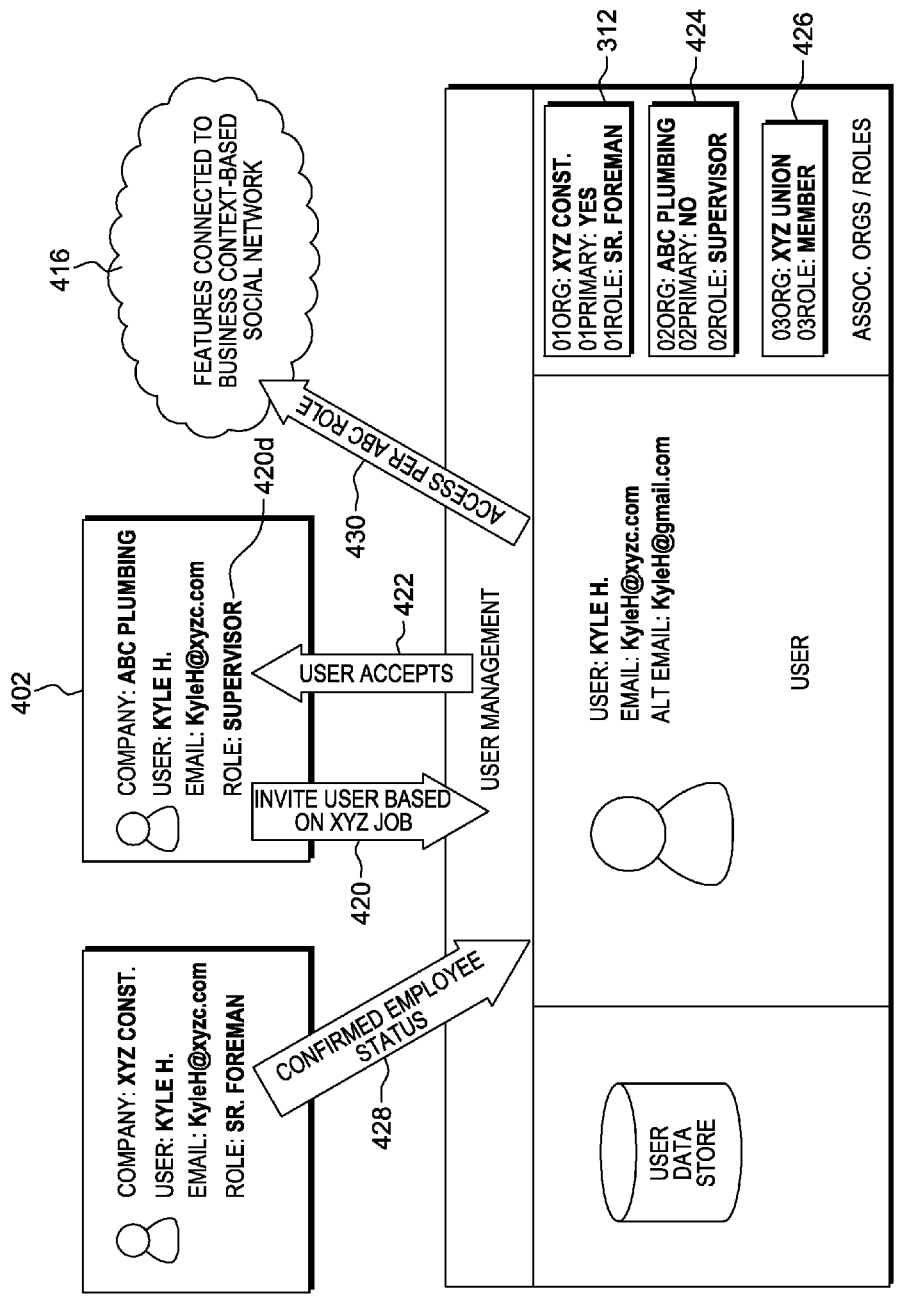
FIG. 4 depicts one example of enabling access to features provided by a first organizational entity within the social network, where the access is based on a verified association between the social network account of a user and a social network account of a second organizational entity within the social network, in accordance with one or more aspects of the present invention.

In FIG. 4, organization ABC Plumbing 402 wishes Kyle to have access to features offered by ABC Plumbing in the social network. Specifically, ABC Plumbing wishes to give Kyle a role of Supervisor 402d with respect to ABC Plumbing. For instance, ABC Plumbing may be a sub-contractor of a job for which XYZ Construction is general contractor. Kyle, by virtue of his employment and role with XYZ Construction as Senior Foreman, may be deemed a supervisor who supervises ABC Plumbing's sub-contracting work. Thus, in this example, an authorized administrator of ABC Plumbing provides an invitation (420) based on Kyle's position with XYZ Construction to associate Kyle's account with the account of ABC Plumbing within the social network. Kyle accepts the invitation (422) to become associated with ABC Plumbing. An association 424 is created indicating that the association is for ABC Plumbing and that Kyle has a role of supervisor. It is also indicated in association 424 that ABC Plumbing is not a primary organization but instead is a secondary organization. Association 424 therefore is a secondary association, since it is based on Kyle's association with XYZ Construction, as his employer. That is, association 424 is maintained by way of the association that Kyle has with his employer XYZ. Association 424 is therefore maintained, in part, by the authorized administrator(s) of XYZ's account, since actions can ultimately control whether association 424 remains in force. (Additionally, association 424 may be maintained, in part, by the authorized administrator(s) of ABC's account. For instance, the administrator(s) of ABC's account could explicitly remove Kyle's association with ABC if desired.) In this manner, secondary, tertiary, etc associations can be created where the continued association between a user and one organization is based on the user's status with a related primary organization. The key distinction between a primary and a secondary, tertiary, etc. association is that a primary association of a user (i.e. to a primary organization) is fully controlled by that organization's authorized administrator(s), whereas a secondary, tertiary, etc. association of the user (i.e. to a secondary, tertiary, etc. organization) is controlled (in part) by that secondary, tertiary, etc.'s organization's administrator (he/she invites the user and can remove the user as desired), and (in part) by the administrator of the primary organization, who by default can break the secondary, tertiary, etc. association by terminating the primary association. Termination of the primary association will, for instance, cascades the effect through to the secondary, tertiary, etc associations which depend on that primary association.

Returning to FIG. 4, verified association 312 is maintained between Kyle's account and the account of XYZ Construction. Verified association 426 is also maintained between Kyle's account and the account of XYZ union, another organization in the social network. XYZ Union is a trade organization, for instance, which membership is not tied to Kyle's employment with any specific employer, but rather is tied to Kyle's profession. Kyle's role with XYZ Union is that of "member". In this example, XYZ union is not indicated as a home organization, but could be if secondary, tertiary, etc. associations could be made based on the XYZ Union membership. Thus, a user can have multiple primary organizations, for instance one primary organization for each of the user's distinct employers, as well as other primary organizations (e.g. trade organization, union, recreational organization, etc.) for non-employee direct relationships.

The invitation from the social network account of ABC Plumbing invites the enabling of access for Kyle's account to one or more features offered within the social network, and in one particular example, to one or more features offered by the account of ABC Plumbing, for instance access to modules otherwise inaccessible to other users in the social network. The invitation can specify that provision of access for Kyle's account to the one or more features offered by the account of ABC Plumbing is to be based on confirmation (e.g. verification) of the relationship between Kyle and XYZ Construction outside of the business context-based social network. That is, the access by Kyle's account can be dependent on the actual relationship between Kyle and his employer, XYZ Construction, outside of the business context-based social network. If Kyle's relationship as employee of XYZ is confirmed (428), i.e. the association 312 is verified, then access can be enabled, automatically in one example, for Kyle's account to the one or more features 416 offered by the account of ABC Plumbing. It can be determined whether association 312 is verified, for instance, and based on this verification and ABC's indicated role for Kyle as supervisor, access can be provided (430) for Kyle's account to features 416.

If ABC Plumbing wishes to give Kyle's account access to one or more features 416 but it is determined that the RELATIONSHIP between Kyle and XYZ Corporation outside of the social network is not confirmed (such as if association 312 is unverified), access to the features may be withheld. Alternatively, provisional access, such as limited functionality or a limited set of privileges with respect to features 416, may be provided until the association becomes verified. In one example, a warning can be given to the account of ABC Plumbing that the relationship between Kyle and XYZ Construction outside of the business context-based social network is not confirmed. Provisional access privileges to features 416 can be enabled for Kyle's account. This provisional access may be overseen and/or managed by ABC Plumbing itself, rather than being based on Kyle's (unverified) role as Senior Foreman with XYZ Construction. Later, based on confirmation of the relationship between Kyle and XYZ Construction (such as association 312 becomes verified—perhaps by an authorized administrator of the account of XYZ Construction), the provisional access privileges can be converted into regular access that is managed by XYZ Construction. Managed, in this sense, refers to the fact that actions by the administrator(s) of XYZ Construction's account, such as to change association 312, can affect Kyle's access to features 416 offered by the account of ABC plumbing, as described further below with reference to FIG. 5.

The arrangement described above in connection with FIG. 4 provides the distribution of responsibility for managing access to features within the social network to the organizations whose members are being given access based on their relationships with the organizations. Associations between the users and organizations can be relied upon because they are validated by the users/organization within the social network. Management of access to features is thus distributed to the organizations that control the association(s) to the users in the network, similar to the how the organizations control the relationship that they have with the user outside of the social network.

Using the above example, assume that sub-contractor ABC Plumbing wishes to give electronic access to reports to legitimate employees of XYZ Construction. An administrator of ABC's account can provide an invitation in order for Kyle (as XYZ's Senior Foreman) to access the reports (i.e. the reports being a feature of ABC's account that ABC wishes to make available to Kyle's account). The access can be made dependent on Kyle's verified relationship with XYZ Corporation. This is advantageous because ABC Plumbing will not necessarily know immediately if/when Kyle's relationship with XYZ changes, for instance if his employment is terminated or he is demoted such that access to ABC's reports would be inappropriate. When the access for Kyle's account is based on the verified association between XYZ's account and Kyle's account, access to ABC's provided features can be made to disable (automatically in one embodiment) based on the administrator XYZ's authorized administrators, for instance to change the association between XYZ's account and Kyle's account if a change occurs in their relationship outside of the social network.

Similarly, as described above, tertiary associations and access to features could depend on association 426 between Kyle's account and ABC's account to provide access to features offered by the other organizations. For instance, a sub-contractor QRS Company that sub-contracts a part of ABC Plumbing's work for XYZ Construction could, based on ABC's association with Kyle, invite Kyle to access features offered by QRS in the social network, thereby associating QRS as a tertiary organization with respect to user Kyle in the social network.

In this manner, a change in an association (such as the association becoming unverified) between an account of an organizational entity and an account of a user can cause revocation of access provided for the account of the user to the features offered by the account of other organizational entity/entities. The change in the association between the account of the organizational entity and the account of the user may be based on a change in the relationship between the user and the organizational entity outside of the business context-based social network, such as a change in employment status of the user with the organizational entity, or a change in membership status of the user with the organizational entity. This is further described and depicted with reference to FIG. 5.

Figure 5:
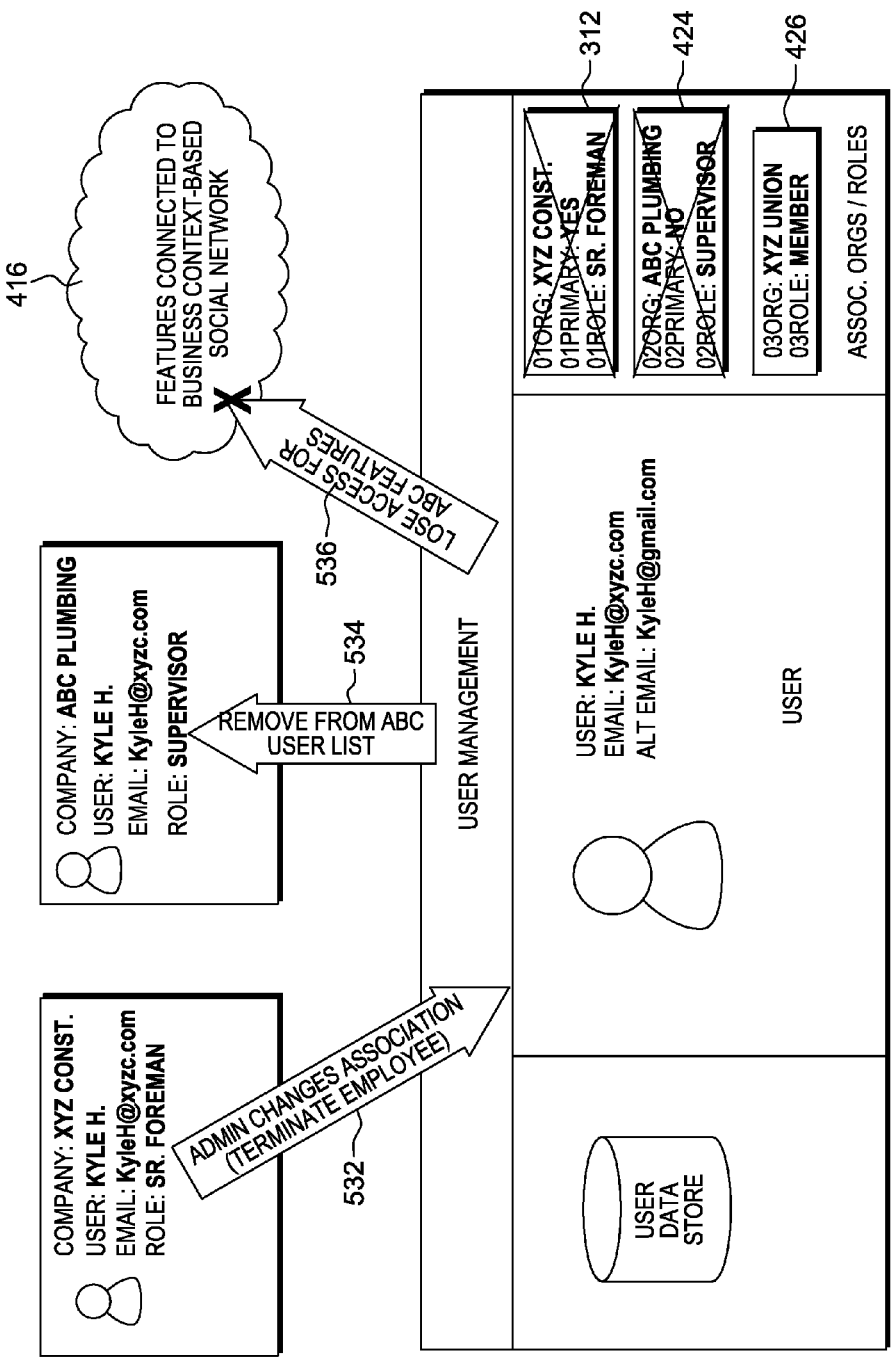
FIG. 5 depicts one example of revoking access to features provided to an account of a user by a first organizational entity based on a change in the association between the account of the user and the account of the second organizational entity, in accordance with one or more aspects of the present invention.

FIG. 5 depicts one example of revoking access to features provided to an account of a user by a first organizational entity based on a change in the association between the account of the user and the account of a second organizational entity, in accordance with one or more aspects of the present invention. In FIG. 5, an authorized administrator of XYZ's account makes changes (532) to the association 312 between Kyle's account and XYZ's account. In this example, Kyle is terminated as an employee of XYZ Construction (termination of employment being the change in their relationship). This change is reflected in a change to the association 312 between Kyle's account and XYZ's account. Additionally, since Kyle's access to features provided by ABC's account is based on verification of the association between Kyle's account and XYZ's account, which association is now unverified, Kyle is removed as a user (534) from the user list of ABC Plumbing (i.e. the list of users with access to feature(s) offered by ABC Plumbing's account) and the association 424 between Kyle's account and ABC's account also changes (for instance becomes unverified). As a result, Kyle's account loses access (536) to features 416 that are dependent on the association(s) which become changed as a result of the changed relationship, including one or more features provided by ABC Plumbing's account, as well as one or more features provided by XYZ's account.

It is noted that the associations between Kyle's account and the XYZ and ABC accounts can be maintained in the User Data Store as past verified associations. While some or more privileges that were once given based on these associations may no longer be given (since they are no longer confirmed), they can at least provide a trustworthy account that Kyle was previously employed/associated with the two companies. This in itself is valuable information because it provides a verified history of employment and other association(s) that Kyle had with other organizations.

Further, Kyle's association 426 with XYZ union is unaffected in this example since the association is not tied to Kyle's employment with any particular employer. In this manner, and as noted above, some associations between a user account and organization account can be perpetual, where access to features provided by the organization's account is enabled for essentially as long as the user account is active. Access to particular features provided by a 401k provider, for instance, will not necessarily become disabled when the employee leaves his/her employer, since 401k accounts are tied to the individual rather than the individual's employer. Hence, some associations can be permanent. Additionally or alternatively, some associations can be time-limited (up to a certain age of the user, or for a certain duration of time, and/or could be subscription-based, such as access to member benefits offered by an organization so long as membership dues continue to be paid).

Figure 6:
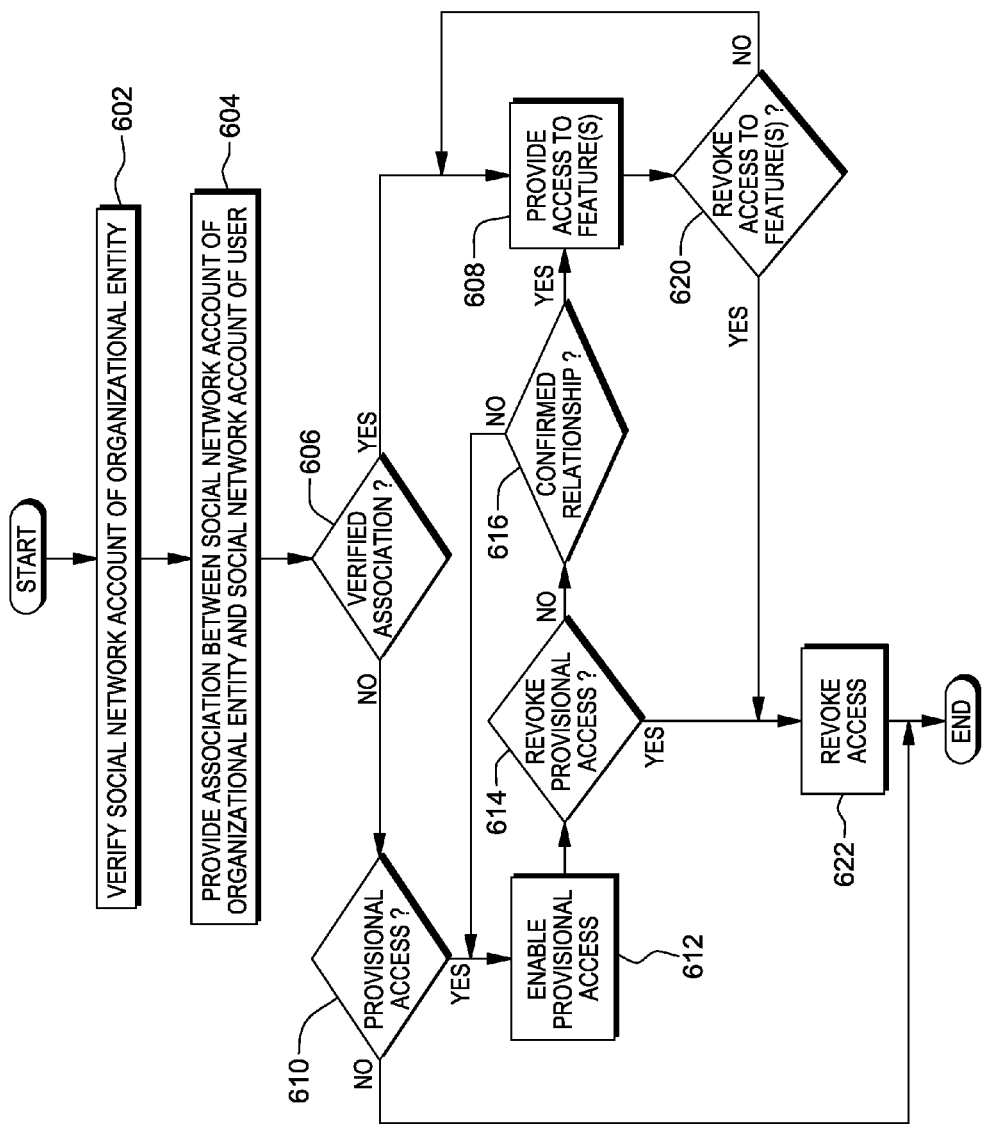
FIG. 6 depicts an example process for providing access to features in a business context-based social network, in accordance with one or more aspects of the present invention.

As described above, access to features in a business context-based social network can be provided based on the associations between users and organizational entities within the social network, and more specifically based on whether those organizational entities and the associations they have with users have been verified. FIG. 6 depicts an example process for providing access to features in a business context-based social network, in accordance with one or more aspects of the present invention. The process begins with verification of the social network account of the organizational entity (602). In one example, this verification is provided by a verification entity, such as an authority that has an established relationship with the organizational entity. Next, an association is provided between the social network account of the organizational entity and a social network account of a user (604). In one example, a user creates this association by indicating a relationship he/she has with the organization, such as an employment or member relationship. In other examples, the association is provided based on an invitation by an authorized administrator of the account of the organization. Next, a determination is made whether the association is verified (606). The association is verified, in one example, by an authorized administrator of the account of the organizational entity, for instance by verifying that the association that the user created is accurate. Alternatively, if an invitation was provided to the user the, association is automatically verified when the user accepts the invitation that is sent by the authorized administrator. Verifying the association confirms the relationship between the user and the organizational entity outside of the business context-based social network, relationship is represented in the social network by the association between the accounts and indicated in that association.

If the association is verified, access is enabled for the social network account of the user to one or more features (608), which may include features offered by the social network account of the organizational entity and/or features offered by the social network account of another organizational entity in the business context-based social network. If however, the association is not verified, it is determined whether provisional access privileges are to be enabled for the social network account of the user to the one or more features (610). In one example, when features are offered by an organizational entity, it can be indicated whether the features are to be provisionally accessible when an association is indicated (but unverified) between a user's account and the organizational entity's account. In some embodiments, it may be indicated that no provisional access is to be provided, while in other embodiments, provisional access may be enabled, which can include various levels of provisional access with differing capabilities, depending on the association being indicated.

If at 610 is it determined that no provisional access privileges are to be enabled, the process ends. Otherwise, provisional access privileges to the one or more features are enabled (612). The provisional access itself may be revoked, for instance based on lapse of a particular amount of time or occurrence (such as a trial period to access the features). Thus, at 614 it is determined whether to revoke the provisional access privileges. If so, access privileges are revoked (622), to thereby revoke access to the features, and the process ends. Otherwise, it is determined whether the relationship between the user and the organizational entity, as indicated by the association between the user's account and the organizational entity's account, is confirmed (616). If the relationship is confirmed, meaning the association is verified, then the provisional access privileges can be converted into regular (verified) access to the feature(s). In the example where the features to be provided are features offered by one organizational entity based on the verification of the relationship between the user and another organizational entity, the access to the features becomes managed by the another organizational entity, as described above.

If instead at 616 it is determined that the relationship between the user and the organizational entity, represented by the association between the user's account and the organizational entity's account, is not confirmed, then the process returns to 612 where provisional access privileges continue to be provided. Thus, a loop is established when provisional access privileges are provided wherein it is determined whether to revoke the privileges (614) and if not, whether the privileges are to be elevated to non-provisional status based on the relationship being confirmed (616).

Assuming regular (verified) access to feature(s) is provided, it is determined whether to revoke the access to the feature(s) (620). In one embodiment, this is determined based on observation of a change to an association between the account of the user and the account of the organizational entity. For instance, if a change is observed, it can be determined what the change is and whether that change warrants revocation of the user account's access to the feature(s). In one particular example, this revocation can be automatic when an authorized administrator of the organizational entity changes the association between the user's account and the organizational entity's account. In other embodiments, a message can be displayed to the organizational entity/entities that have offered features to the user based on the user's association with the organizational entity for the which the association changed. For instance, in the above example, when association 312 is changed by an administrator of XYZ's account, the XYZ administrator's account may receive a message asking whether features offered by XYZ's account to Kyle's account should be revoked. Additionally, the account of ABC Plumbing (and/or accounts of the authorized administrators thereof) may receive a message, such as a warning, that the association between Kyle's and XYZ's account has changed, may indicate the change, and may prompt the authorized administrator(s) of ABC's account whether access enabled for Kyle's account to feature(s) offered by ABC's account in the social network should be revoked.

If the features are not to be revoked, the process returns to 608 by continuing to provide access to the features. Otherwise, if it is determined that access is to be revoked, then the process continues by revoking access to the provided features (622), and then ends.

Described above is a business context-based social network providing important benefits over existing social network platforms. These advantages include:

(i) An account of an organizational entity can become 'verified', meaning that it has been confirmed that the organizational entity is indeed a real business, that the account of the organizational entity is authorized, and that the administrators of the account of the organizational entity have been verified as being legitimate. This provides increased trustworthiness for the account of that organization in the social network as connections between the organization and users/other organizations are made.

(ii) If a user is invited and managed by his/her primary (home) organization, and that organization is verified, then other 'inviting' organizations can trust that this user is really the person he/she claims and is really associated with the company that he/she claims and in the way that he/she claims. Inviting organizations have a secure means of managing the user population to which features are provided, particularly for non-employees, given the delegation of the maintenance responsibility to a certified home organization. The inviting organizations save time managing users because the work in maintaining the association is handled by the home organization and the home organization can, in some examples, integrate this administration into its existing system(s), such as an existing HR or payroll system.

(iii) Access to features can be explicitly granted based on the fact that the user is a member of a home organization and, if desired, based on a particular job or role of that user in that organization. Based on this explicit association to the home organization, a change in this association can cause an immediate revocation in the access provided for the user's account to features offered by another (secondary) organization. This revocation can occur without any specific action on the part of the secondary organization. The home organization in this case assumes the responsibility of maintaining in the social network a current and trustworthy reflection of the user's actual relationship with the organization outside of the social network. This is advantageous because the home organization has the most immediate knowledge of changes in its relationship with the user. The organization is in the best position to control how that relationship is reflected within the social network. Ongoing, accurate management of this association by the home organization is therefore much more practical than the secondary organization(s) having to keep aware of the association.

(iv) User can have one or more home organizations, such as if they work part time for multiple employers or contract for multiple companies. The association between a user and an inviting organization inviting the user to access feature(s) offered by the inviting organization, can be based on any of the associations that the user may have to various organizations. As a result, a single user can have multiple home organizations with access to services based on any one or more of the multiple home associations.

(v) A home organization can provide other organizations with access to all or a subset of the verified employee or associate accounts, to allow them to discover possible connections to those users and grant them access to additional services. This enables easy growth of a user population while appropriately maintaining the security and privacy of the home organization's employees.

(vi) A user can have a single sign-on to the social network which grants the user's account access to all of the user's associated organizations and the features offered by those organizations in the social network. Akin to a single-sign on mechanism, a service provider can use the unique identification of the user to manage that user's access to their services. The social network can additionally allow the service provider(s) to pass back and manage user credentials in the social network so that all user requests for their services are naturally mapped to the service's own security record, simplifying the efforts to support single sign-on. By storing an associated token or other credential(s) with the user's data, this allows the easy access of this service by the user from inside other services.

The verification of organizations and the associations between those organizations and users fundamentally changes the model for managing trusted interaction, collaboration, and use of shared services. Organizations and users are provided a dependable way to administer and obtain access to features, and manage that access, while placing the maintenance of the associations within the network in the control of the organizations who are in the best position to reflect changes in the relationships. The business context-based social network thus becomes a self-managed business online community.

Trusted administrators from each organization assume responsibility for maintaining current records for the organization employees or associates. As an individual joins or leaves the organization, then his/her membership is maintained in that context by one of these administrators. To relieve some of this administrative burden, the relationship maintenance can be integrated with the organization's human resources or payroll system so that the new employees, job changes, and terminations automatically flow through to a user's status with the organization within the social network. For instance, when an employee is indicated as having retired in an HR and/or payroll system, the association between the account of the organization, as employer, and the account of the user, as employee, can be changed to reflect this retirement within the social network.

One or more verification authorities perform validation of the organizations initially and/or on an ongoing basis to ensure that the organization is legitimate and ongoing. In one example, it there is turnover or other change and all/some authorized administrators of an account of an organizational entity are lost, the certification authority could be relied upon to confirm the organizational entity and/or authorize new administrators.

Organizations can freely establish an account in the social network. The verification of the organization process may happen as part of that signup or be a follow up process. Once an account of an organization is established, the authorized administrator(s) of the organization's account are able to send a secure invitation to an employee/associate in order to establish an association in the social network, the association indicating a relationship between the employee/associate and the organization outside of the social network. The user himself/herself is validated, for instance based on HR records, etc., as the real individual and accepts the invitation, and this process is a two-way link.

In one example, the business context-based social network includes facilities to resolve potential duplicate signups and invitations, to ensure that an organization is resolved to a single company/association and a user is resolved to a single person.

Additionally, the business context-based social network can incorporate a flexible sign-on mechanism that allows a user to change profile information, such as his/her email address when the user changes jobs, but still maintain the user's unique identity in the business context-based social network. In this manner, a user in the social network has a single, on-going (e.g. for life) identity in the social network, where all of the user's associations and roles from the past to the present are maintained.

Advantageously, business context-based social network population can grow seamlessly by incorporating an open signup process for organizations and users where anyone can sign up for an account and create associations which are, initially, unverified. The status of the associations (verified, unverified) can be made conspicuous and immediately accessible to other users and organizations within the social network, so that transparency is maintained. Thus, unverified organizations, users, and associations can exist in the social network, but their unverified nature can be made clear so that users and organizations can make decisions accordingly about whether feature access is to be enabled. Those organizations and users become progressively more trustworthy as their associations become verified and connections are developed between home organizations, and secondary, tertiary, etc. organizations based on those home associations.

Significant advantage is derived from the fact that the verification of accounts and associations within the social network provides assurance that would normally not be provided. Knowing whether a person is an actual employee of an organization, and automatically providing (or withholding) access to features based on that knowledge, is an important aspect in one embodiment of the social network. Also, in addition to feature enablement based on associations within the network, user information including payroll (e.g. paystubs), financial, and retirement (e.g. 401k account) information can be rolled into the network, as well as personal 'gadgets' such as weather, news, other social networking accounts (Facebook), and/or other online profiles and services (Google profile/services) can be incorporated. This provides an opportunity for the user to manage all of his/her work and personal services together in a single environment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 7:
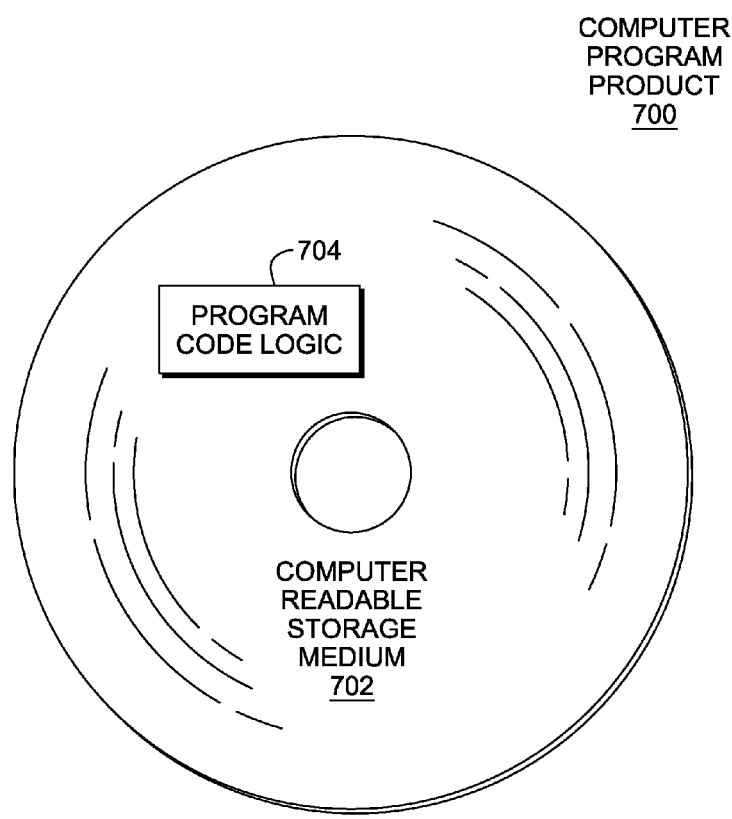
FIG. 7 depicts one embodiment of a computer program product to incorporate one or more aspects of the present invention.

Referring now to FIG. 7, in one example, a computer program product 700 includes, for instance, one or more computer readable media 702 to store computer readable program code means or logic 704 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method for providing access to features in a business context-based social network, wherein the method comprises:

verifying a social network account of a first organization in the business context-based social network, the verified social network account of the first organization having associated therewith one or more authorized administrators of the verified social network account of the first organization, wherein the verifying comprises receiving from a verification entity a confirmation that the first organization is legitimate and that the one or more administrators are authorized by the first organization to administer the social network account of the first organization;

providing an association between the verified social network account of the first organization and a social network account of a user of the business context-based social network, the association representative of a relationship between the user and the first organization outside of the business context-based social network, and indicating a role of the user with respect to the first organization; and based on the verifying the social network account of the first organization and on the providing the association, enabling, by a processor, for the social network account of the user, access to one or more features offered by a social network account of a second organization, different from the first organization, in the business context-based social network, wherein the access provided for the social network account of the user to the one or more features offered by the social network account of the second organization is authorized based on the provided association between the verified social network account of the first organization and the social network account of the user, and based further on enablement by the second organization of the access based on the provided association.

2. The method of claim 1, further comprising, based on a change in the association between the verified social network account of the first organization and the social network account of the user, revoking the access provided for the social network account of the user to the one or more features offered by the social network account of the second organization.

3. The method of claim 2, wherein the change in the association between the verified social network account of the first organization and the social network account of the user is based on a change in relationship between the user and the first organization outside of the business context-based social network.

4. The method of claim 3, wherein the change in relationship between the user and the first organization outside of the business context-based social network comprises a change in employment status of the user with the first organization or a change in membership status of the user with the first organization.

5. The method of claim 1, further comprising verifying the provided association between the verified social network account of the first organization and the social network account of the user, the verifying confirming the relationship, represented by the association, between the user and the first organization outside of the business context-based social network.

6. The method of claim 5, wherein the verifying of the provided association between the verified social network account of the first organization and the social network account of the user is by an authorized administrator of the one or more authorized administrators of the verified social network account of the first organization.

7. The method of claim 1, further comprising providing an invitation from the social network account of the second organization inviting access for the social network account of the user to the one or more features offered by the social network account of the second organization, wherein the invitation specifies that provision of access for the social network account of the user to the one or more features offered by the social network account of the second organization is to be based on confirmation of the relationship between the user and the first organization outside of the business context-based social network.

8. The method of claim 7, further comprising determining whether the relationship between the user and the first organization outside of the business context-based social network is confirmed.

9. The method of claim 8, wherein based on determining that the relationship between the user and the first organization outside of the business context-based social network is confirmed, the enabling the access for the social network account of the user to the one or more features offered by the social network account of the second organization is provided automatically.

10. The method of claim 8, wherein based on determining that the relationship between the user and the first organization outside of the business context-based social network is not confirmed, the method further comprises:
providing a warning to the social network account of the second organization that the relationship between the user and the first organization outside of the business context-based social network is not confirmed;
enabling provisional access privileges for the social network account of the user to the one or more features offered by the social network account of the second organization, in which access by the social network account of the user to the one or more features offered by the social network account of the second organization is managed by the second organization; and
based on subsequent confirmation of the relationship between the user and the first organization outside of the business context-based social network, converting the provisional access privileges into the provided access based on the provided association between the verified social network account of the first organization and the social network account of the user, in which access by the social network account of the user to the one or more features offered by the social network account of the second organization becomes managed by the first organization.

11. The method of claim 1, wherein the verification entity is separate from the first organization for which the social network account is verified.

12. A computer system for providing access to features in a business context-based social network, the computer system comprising:
a memory; and
a processor, in communications with the memory, the processor configured to execute program code stored in the memory to perform:
verifying a social network account of a first organization in the business context-based social network, the verified social network account of the first organization having associated therewith one or more authorized administrators of the verified social network account of the first organization, wherein the verifying comprises receiving from a verification entity a confirmation that the first organization is legitimate and that the one or more administrators are authorized by the first organization to administer the social network account of the first organization;
providing an association between the verified social network account of the first organization and a social network account of a user of the business context-based social network, the association representative of a relationship between the user and the first organization outside of the business context-based social network, and indicating a role of the user with respect to the first organization; and
based on the verifying the social network account of the first organization and on the providing the association, enabling, for the social network account of the user, access to one or more features offered by a social network account of a second organization, different from the first organization, in the business context-based social network, wherein the access provided for the social network account of the user to the one or more features offered by the social network account of the second organization is authorized based on the provided association between the verified social network account of the first organization and the social network account of the user, and based further on enablement by the second organization of the access based on the provided association.

13. The computer system of claim 12, wherein the processor is configured to execute program code stored in the memory to further perform, based on a change in the association between the verified social network account of the first organization and the social network account of the user, revoking the access provided for the social network account of the user to the one or more features offered by the social network account of the second organization.

14. The computer system of claim 13, wherein the change in the association between the verified social network account of the first organization and the social network account of the user is based on a change in relationship between the user and the first organization outside of the business context-based social network.

15. The computer system of claim 12, wherein the processor is configured to execute program code stored in the memory to further perform verifying the provided association between the verified social network account of the first organization and the social network account of the user, the verifying confirming the relationship, represented by the association, between the user and the first organization outside of the business context-based social network.

16. The computer system of claim 12, wherein the processor is configured to execute program code stored in the memory to further perform providing an invitation from the social network account of the second organization inviting access for the social network account of the user to the one or more features offered by the social network account of the second organization, wherein the invitation specifies that provision of access for the social network account of the user to the one or more features offered by the social network account of the second organization is to be based on confirmation of the relationship between the user and the first organization outside of the business context-based social network.

17. A computer program product for providing access to features in a business context-based social network, the computer program product comprising:
    a non-transitory computer readable storage medium readable by a processor and storing instructions for execution by the processor to perform a method comprising:
        verifying a social network account of a first organization in the business context-based social network, the verified social network account of the first organization having associated therewith one or more authorized administrators of the verified social network account of the first organization, wherein the verifying comprises receiving from a verification entity a confirmation that the first organization is legitimate and that the one or more administrators are authorized by the first organization to administer the social network account of the first organization;
        providing an association between the verified social network account of the first organization and a social network account of a user of the business context-based social network, the association representative of a relationship between the user and the first organization outside of the business context-based social network, and indicating a role of the user with respect to the first organization; and
        based on the verifying the social network account of the first organization and on the providing the association, enabling, for the social network account of the user, access to one or more features offered by a social network account of a second organization, different from the first organization, in the business context-based social network, wherein the access provided for the social network account of the user to the one or more features offered by the social network account of the second organization is authorized based on the provided association between the verified social network account of the first organization and the social network account of the user, and based further on enablement by the second organization of the access based on the provided association.

18. The computer program product of claim 17, wherein the method further comprises, based on a change in the association between the verified social network account of the first organization and the social network account of the user, revoking the access provided for the social network account of the user to the one or more features offered by the social network account of the second organization, and wherein the change in the association between the verified social network account of the first organization and the social network account of the user is based on a change in relationship between the user and the first organization outside of the business context-based social network.

19. The computer program product of claim 17, wherein the method further comprises providing an invitation from the social network account of the second organization inviting access for the social network account of the user to the one or more features offered by the social network account of the second organization, wherein the invitation specifies that provision of access for the social network account of the user to the one or more features offered by the social network account of the second organization is to be based on confirmation of the relationship between the user and the first organization outside of the business context-based social network.

20. The method of claim 1, wherein the verifying is based at least partially on information maintained by the verification entity, the information comprising a maintained customer base of organizations known by the verification entity to be legitimate, and further based at least partially on verified real-world business dealings between the verification entity and the first organization.

* * * * *